(12) United States Patent
Duan et al.

(10) Patent No.: US 9,262,732 B2
(45) Date of Patent: Feb. 16, 2016

(54) SYSTEM AND METHOD OF ENTERPRISE ACTION ITEM PLANNING, EXECUTING, TRACKING AND ANALYTICS

(75) Inventors: Bin Duan, San Jose, CA (US); Lap Chan, Daly City, CA (US)

(73) Assignee: SAP SE, Walldorf, DE (US)

( * ) Notice: Subject to any disclaimer, the term of this patent is extended or adjusted under 35 U.S.C. 154(b) by 405 days.

(21) Appl. No.: 13/166,501

(22) Filed: Jun. 22, 2011

(65) Prior Publication Data

US 2012/0331036 A1 Dec. 27, 2012

(51) Int. Cl.
*G06Q 10/06* (2012.01)
*H04W 64/00* (2009.01)

(52) U.S. Cl.
CPC ......... *G06Q 10/0631* (2013.01); *H04W 64/006* (2013.01)

(58) Field of Classification Search
CPC .................................................. G06Q 10/0631
See application file for complete search history.

(56) References Cited

U.S. PATENT DOCUMENTS

| | | | | |
|---|---|---|---|---|
| 6,618,593 | B1 * | 9/2003 | Drutman et al. | 455/456.3 |
| 6,732,080 | B1 * | 5/2004 | Blants | 705/7.18 |
| 7,577,522 | B2 * | 8/2009 | Rosenberg | 701/433 |
| 7,593,739 | B2 * | 9/2009 | Oguri et al. | 455/456.1 |
| 7,856,360 | B2 * | 12/2010 | Kramer et al. | 705/1.1 |
| 8,224,686 | B1 * | 7/2012 | Bruce et al. | 705/7.29 |
| 8,229,458 | B2 * | 7/2012 | Busch | 455/456.1 |
| 2003/0018510 | A1 * | 1/2003 | Sanches | 705/9 |
| 2003/0022676 | A1 * | 1/2003 | Nakamoto et al. | 455/456 |
| 2006/0270419 | A1 * | 11/2006 | Crowley et al. | 455/456.2 |
| 2008/0103946 | A1 * | 5/2008 | Johnson et al. | 705/30 |
| 2008/0306826 | A1 * | 12/2008 | Kramer et al. | 705/14 |
| 2009/0281843 | A1 * | 11/2009 | Coffman et al. | 705/5 |
| 2011/0047182 | A1 * | 2/2011 | Shepherd et al. | 707/780 |
| 2011/0125566 | A1 * | 5/2011 | McLaughlin et al. | 705/14.23 |
| 2011/0137929 | A1 * | 6/2011 | Lehmann et al. | 707/769 |
| 2011/0161444 | A1 * | 6/2011 | Chauhan | 709/206 |
| 2011/0225250 | A1 * | 9/2011 | Cypes et al. | 709/206 |
| 2011/0246209 | A1 * | 10/2011 | Jagannathan et al. | 705/1.1 |
| 2011/0252095 | A1 * | 10/2011 | Cypes et al. | 709/205 |
| 2011/0307948 | A1 * | 12/2011 | Ranjan et al. | 726/9 |
| 2012/0030210 | A1 * | 2/2012 | Sankhla et al. | 707/741 |
| 2012/0059767 | A1 * | 3/2012 | Uthmann | 705/319 |
| 2012/0166244 | A1 * | 6/2012 | Raj et al. | 705/7.13 |
| 2012/0208549 | A1 * | 8/2012 | Lau et al. | 455/456.1 |

* cited by examiner

*Primary Examiner* — Joe Chacko
(74) *Attorney, Agent, or Firm* — Fountainhead Law Group PC

(57) ABSTRACT

A system and method of tracking action items in an enterprise data processing environment. The method includes receiving, by a client from a server, an action item that includes a location. The method further includes performing a check-in, by the client, at the location related to the action item. The method further includes performing a check-out, by the client, related to the action item. The method further includes changing, by the client, the status of the action item. In this manner, a database of action items and statuses may be developed for more effective business collaboration and business management.

19 Claims, 3 Drawing Sheets

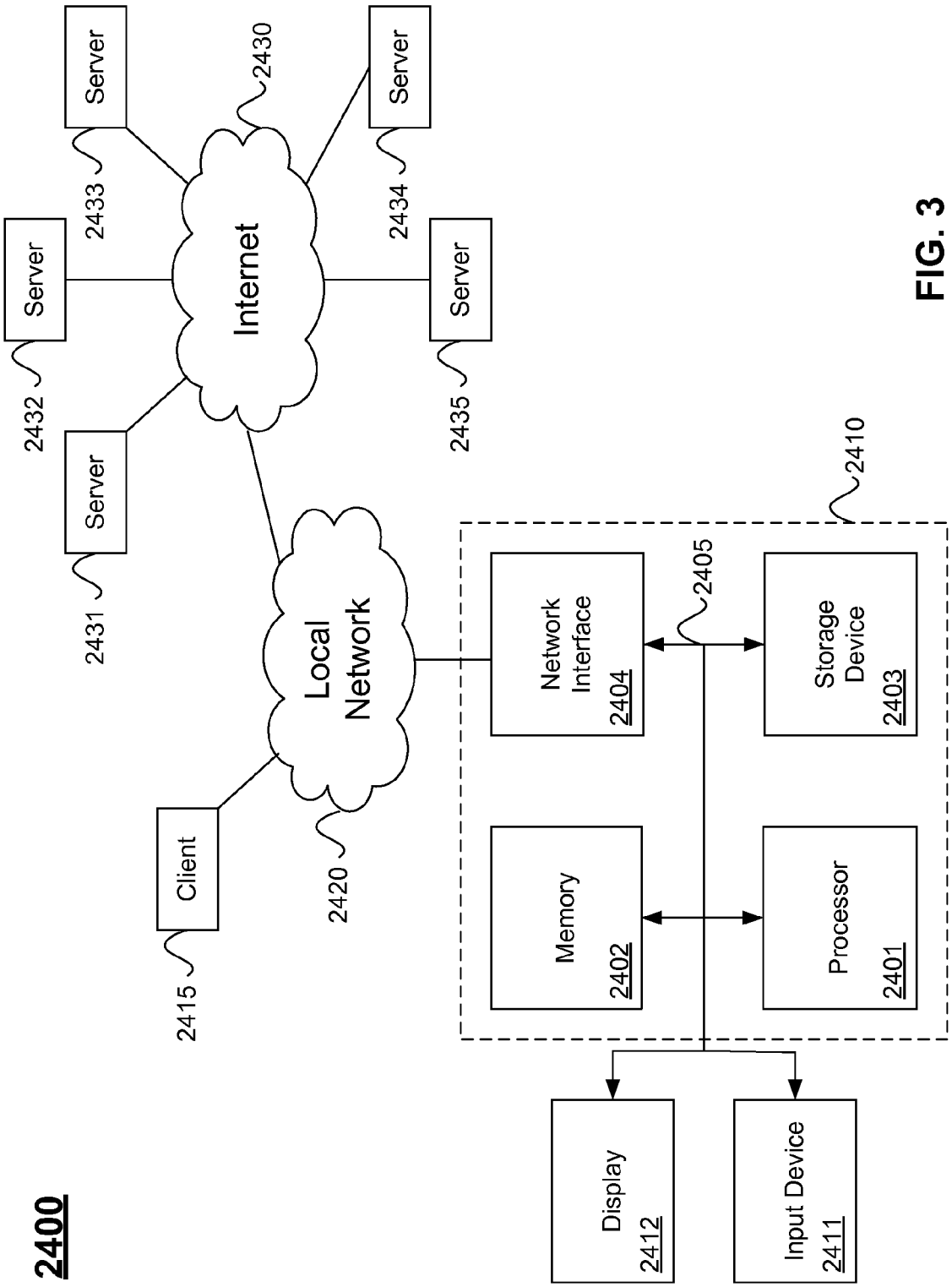

SYSTEM AND METHOD OF ENTERPRISE ACTION ITEM PLANNING, EXECUTING, TRACKING AND ANALYTICS

CROSS REFERENCE TO RELATED APPLICATIONS

Not applicable.

BACKGROUND

1. Field of the Invention

The present invention relates to tracking action items, and in particular, to tracking action items in an enterprise data processing environment.

2. Description of the Related Art

Unless otherwise indicated herein, the approaches described in this section are not prior art to the claims in this application and are not admitted to be prior art by inclusion in this section.

The use of the check-in concept has grown along with the increase in location-enabled mobile devices. A check-in may be performed automatically (e.g., the system detects the position of the mobile device near a location) or manually (e.g., the user selects from nearby check-in location options). Rewards, discounts or achievements may be associated with checking in (or performing multiple check-ins). The check-in may be published, either publicly or to a selected group. Examples of check-in services include the Facebook™ service, the Foursquare™ service, and the Gowalla™ service.

Groupware (also generally referred to and including microblogging and social networking) enables groups of individuals to coordinate documents, tasks, activities, calendars, schedules and messages. A particular groupware service may perform one function (e.g., messaging) and may integrate with another groupware service that performs another function (e.g., calendaring). Examples of groupware include the Microsoft™ Outlook™ service, the Google™ Docs™ service, the SocialCast™ service, the Yammer™ service, and the Twitter™ service.

The integration between check-in services and groupware is typically limited. For example, when a user checks in, the check-in service sends a message to the user's selected group.

SUMMARY

Many existing enterprise mobile applications on the market do not provide a people-centric mechanism for mobile users to work on action items. Their disadvantages can be summarized as follows. First, they are not capable of easily planning, logging, tracking and reporting daily action items that are associated with business objects. Second, they require constant information look ups and do not keep data entries to their minimum. Third, some of them do offer support for collaborations, but limited to sending/receiving feed only. There is a lack of ways to present action item statuses for related team members in one single place.

Given the above disadvantages, embodiments of the present invention improve tracking action items in an enterprise data processing environment. One embodiment includes a computer-implemented method of tracking action items in an enterprise data processing environment. The method includes receiving, by a client computer from a server computer, an action item. The action item includes a location. The method further includes determining, by the client computer, that the client computer is at the location related to the action item. The method further includes determining, by the client computer, that the client computer is no longer at the location. The method further includes changing, by the client computer, a status of the action item.

A system that includes a server computer and a client computer may be configured to perform the above method, for example by executing one or more computer programs. A non-transitory computer readable medium may store instructions to control a computer system to perform the above method, for example by being executed by a client computer.

Determining that the client computer is at the location may correspond to a check-in, and determining that the client computer is no longer at the check-in may correspond to a check-out.

The action item may be associated with a group of users, one of whom may perform the check-in and the check-out, and may change the status of the action item. Others of the users may then read the updated status and the other attributes of the action item.

Compared with the existing systems, embodiments of the present invention may have one or more of the following differences or advantages. First, the entire process is different. Existing mobile applications just have "check-in" as a one-step process to broadcast a user's physical location; whereas an embodiment features a full-cycled booking/check-in/check-out process as described above. Second, the purpose is different. Existing mobile applications use "check-in" in a social or personal context to share interesting place and personal interests among friends; whereas an embodiment uses a full-cycled check-in process in the enterprise context to improve both productivity and collaborations for enterprise mobile users who are constantly on the go.

The following detailed description and accompanying drawings provide a better understanding of the nature and advantages of the present invention.

BRIEF DESCRIPTION OF THE DRAWINGS

FIG. 3 is a block diagram of an example computer system and network for implementing embodiments of the present invention.

DETAILED DESCRIPTION

Figure 1:
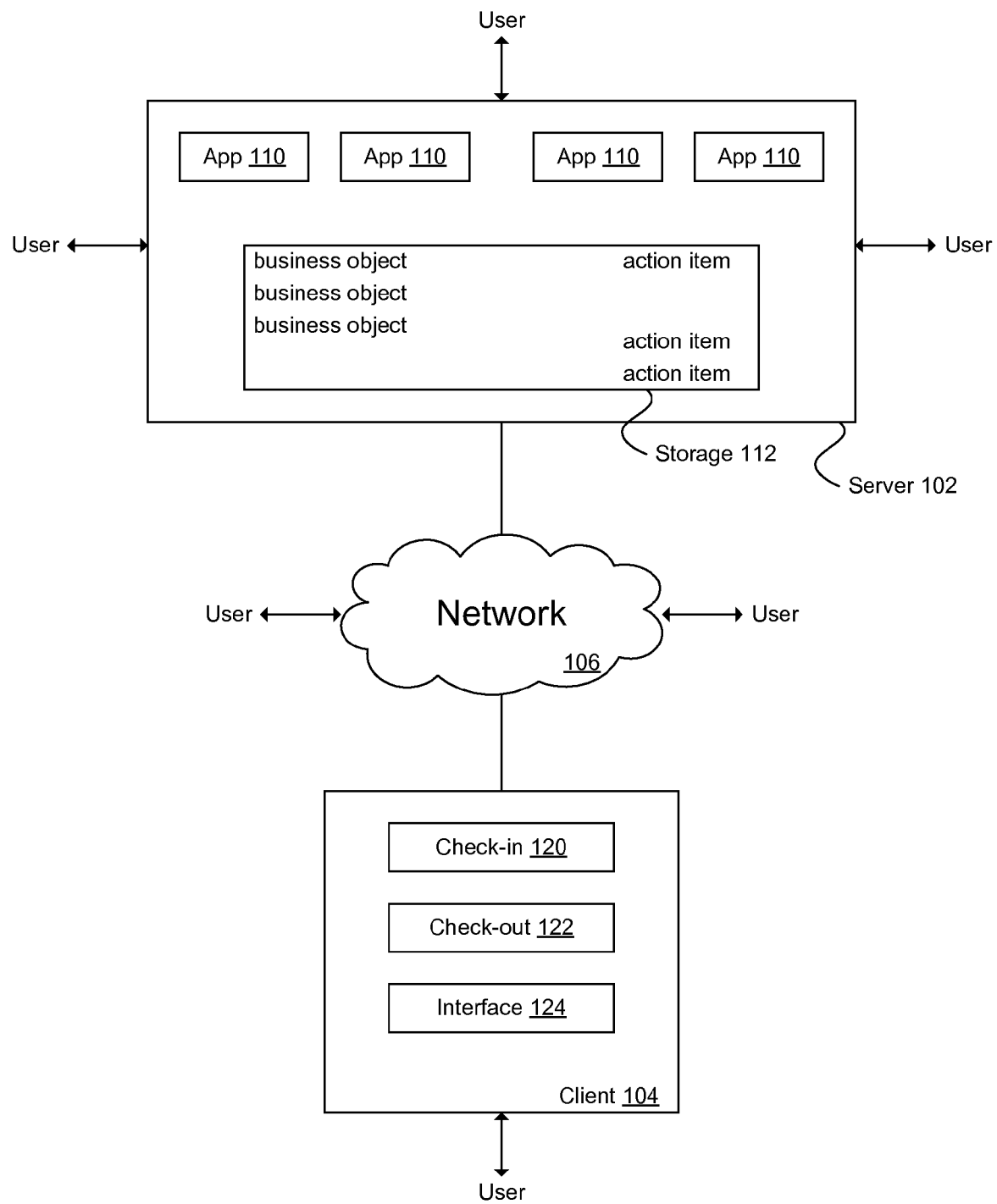
FIG. 1 is a block diagram of a system for tracking action items in an enterprise data processing environment, according to an embodiment.

Described herein are techniques for tracking action items in an enterprise data processing environment. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In this document, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

The term "check-in" is used in this document. In general, a check-in refers to a representation that a particular device is at (or near) a particular location. The device generally includes geolocation features such as a global positioning system (GPS) receiver, cell tower triangulation, WiFi hotspot connectivity, etc. A check-in usually involves a client device (at a particular location) and a server device (that controls the exchange of information with the client device and other client devices). The client device may itself determine the location (e.g., via the device's GPS receiver), or the client device and the server device may together determine the location of the client device (e.g., the client device is connected to a particular WiFi hotspot, and the server device corresponds that particular hotspot to a particular location). As used herein, a check-in does not refer to custody over particular data or documents. For example, checking in a book to the library or checking in a document into a document management system are not within the concept of checking in as described herein. Similarly excluded are checking in to a hotel as part of the standard process for staying in a hotel, checking in to a flight as part of the standard process for travelling by air, etc.

The term "business object" is used in this document. Whereas a computer program may implement classes (which typically end in objects managing or executing behaviors), a business object usually does nothing itself but instead holds a set of instance variables or properties (also known as attributes) and associations with other business objects, weaving a map of objects representing the business relationships. In general, a business object is a code construct (e.g., a data structure) that corresponds directly to a thing in the actual business, where the business uses software (e.g., a computer program) to manipulate the business object as real-world activities take place that are related to the thing. The business object encapsulates the business logic related to the thing, and encapsulates the data that is required by the logic and also describes, defines, makes up, is contained by, or is associated with the thing. In general, the "thing" is recognizable to a non-technical person familiar with the business, like the users, business analysts, etc. For example, in a video rental store business assume things such as video discs, console games, customers, rental orders, late fees, etc. In software representing that business there would be business objects that represent video discs, console games, customers, rental orders, late fees, etc. Each object has data that describes or is attributed to the object and methods that make decisions based on that data. For example, a video disc may have a Title and DateReleased attributes (data), and may have the method <calculate rental price> to determine how much it costs to rent the video disc. Things may be tangible objects with real-world meanings (such as the video discs discussed above), or may be conceptual objects that relate to the business and its business processes (such as a rental agreement or a rental policy).

The term "action item" is used in this document. In general, an action item is a data record indicating a plan to perform a certain business-related action in a future timeframe. In general, the action item is non-recurring; the action item is a step in a larger business process, and once the action item has been performed, other actions in the larger business process are performed. For example, the larger business process may be closing a sale, e.g., "sell computer system to Company X"; an action item would be a sales meeting, e.g., "meet with purchasing contact in Company X to discuss computer system sale". Action items may also be referred to as "tasks", "business tasks", "open items" or "open points".

Action items are often associated with business objects. For example, a business object for Account may have an action item corresponding to a sales meeting; a business object for a Contact may have an action item corresponding to following up on a sales pitch. As a specific example, consider the action item to prepare a sales contract for Company X by Jul. 1, 2011; Company X is the associated business object and July 1 is an attribute of the action item.

An action item may be associated with multiple business objects. For example, consider the action item to follow up with James Wilson of Company X; James Wilson is a first associated business object and Company X is a second associated business object.

An action item may be unassociated with a business object. For example, consider the action item to archive emails by Sep. 9, 2011; this action item has no associated business object but it does have a date attribute.

FIG. 1 is a block diagram of a system 100 for tracking action items in an enterprise data processing environment, according to an embodiment. The system 100 includes a server computer 102 and a client computer 104. A network 106 connects the server computer 102 and the client computer 104. The network 106 may connect the server computer 102 and the client computer 104 with other devices, e.g., multiple server computers 102, multiple client computers 104, the internet, etc.

The server computer 102 in general executes computer programs that configure the server computer 102 to function as a server. The server computer stores and executes one or more applications 110. The server computer 102 includes storage 112. The storage 112 stores data (e.g., action items, business objects, etc.) that are used by the applications 110. One of the applications 110 may control the server computer 102 during the action item tracking process discussed below (see FIG. 2). The server computer 102 may perform other functions that (for brevity) are not further detailed. The server computer 102 may be implemented by one or more hardware devices (see FIG. 3).

The client computer 104 in general executes computer programs that configure the client computer 104 to function as a client. The client computer includes a check-in component 120, a check-out component 122, and an interface component 124. The functions of these components are described in more detail with reference to FIG. 2. The client computer 104 may be implemented by one or more hardware devices (see FIG. 3). More specifically, the client computer 104 may be a mobile device such as a mobile telephone, a personal digital assistant, a tablet computer, a laptop computer, etc. These devices may perform functions other than those related to action item tracking (see FIG. 2) that (for brevity) are not further detailed.

Figure 2:
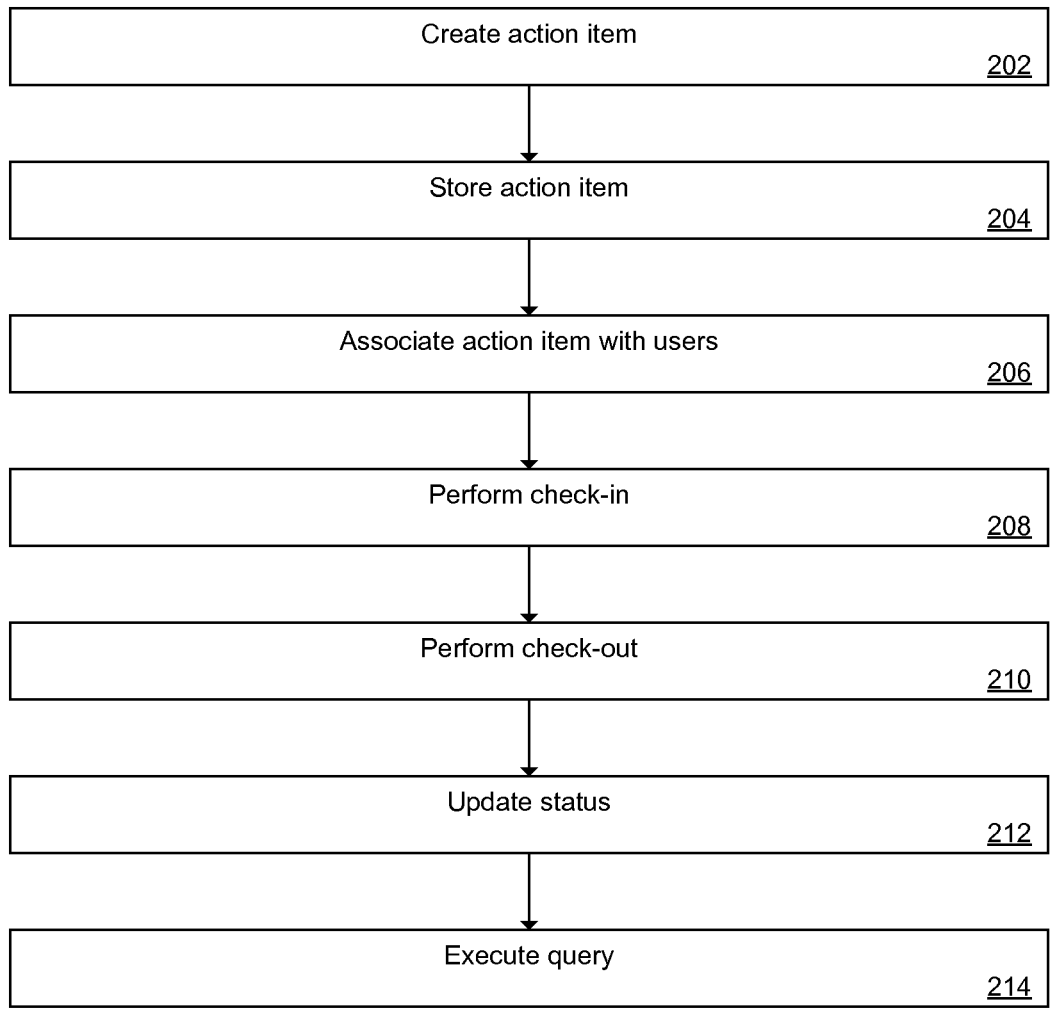
FIG. 2 is a flowchart of an action item tracking process, according to an embodiment.

FIG. 2 is a flowchart of an action item tracking process 200 according to an embodiment. The action item tracking process 200 may be performed by the system 100 (see FIG. 1), e.g. as controlled by one or more computer programs. The process 200 may be generalized into three phases: a setup phase (202, 204 and 206) also referred to as booking, an activity phase (208, 210 and 212) in which the check-in occurs, and an analysis phase (214).

At 202, an action item is created. For example, an action item may be "meeting with Company X"; Company X may be represented in the system 100 by storing a corresponding business object that has various attributes and relations to other business objects. Exemplary attributes include the name of the contact person at Company X, their telephone number, and a status of the action item (new, pending, contacted on date Y, etc.). Another attribute is the location of Company X, which is used for the check-in (see 208). The action item may be related to one or more users (e.g., a sales team) that may include a manager and one or more salespersons.

Using the system 100 (see FIG. 1), a user may create the action item using one of the applications 110, for example a customer relationship management (CRM) application, by interaction via a user interface. The user interface may be provided by the server computer 102 itself, by the client computer 104 interfacing with the server computer 102, by another client computer such as a desktop computer at the user's office location (not shown), etc.

At 204, the action item is stored. (Or to be more precise technically, data representing the action item is stored. The term "task" may be used to refer to the action item in the abstract sense, and the term "task entry" may be used to refer to the stored data representing the action item.) For example, the server computer 102 (see FIG. 1) may store the action item in the storage 112, as a result of creating the action item with one of the applications 110 (see 202). The attributes of the action item (e.g., the status options) may be stored as well.

The action item may be transmitted to, and received by, other devices. For example, the server computer 102 may transmit the action item, and the client computer 104 may receive the action item. This transmission and reception may be performed as part of the general client-server data exchange between the devices. In such an embodiment, the server computer 102 includes a transmission component, and the client computer 104 includes a reception component; these components may perform both transmission and reception functions.

At 206, the action item is associated with users. The users may be a single user (e.g., the user who creates the action item) or a group of users that may (or may not) include the user that created the action item.

At this point, one or more action items are ready to be acted upon, and the process 200 continues with the activity phase.

At 208, a check-in is performed. More specifically, the system 100 (see FIG. 1) determines that a check-in occurs when the client device 104 is at a location that corresponds to an action item. (The phrase "at a location" is to be considered to include "near the location", for example when the granularity of the GPS receiver is such that "near" a location is indistinguishable from "at" the location.) For example, assume that the server computer 102 stores ten action items, and that a particular user is associated with three of the action items. When the user (or more accurately, when the user's client computer 104) arrives near a location related to one of the three action items, a check-in occurs for the user for that action item.

The client computer 104 may include features that automatically perform a check-in. For example, assume the location of the action item is a set of GPS coordinates, the client computer 104 stores the action item locally, and the client computer 104 has a GPS receiver; for this case, the client computer 104 determines that the check-in occurs when its GPS coordinates correspond to those of the stored action item. Similar results occur when the client computer 104 is using cell tower triangulation, WiFi hotspot connection, etc. As another example, assume the client computer 104 has a GPS receiver and is in contact with the server computer 102; for this case, the server computer 102 determines that the check-in occurs when its GPS coordinates correspond to those of one of the action items that the server computer 102 stores. As a further option, the client computer 104 may ask the user to confirm a check-in that has been determined, or may present multiple possible check-ins for the user to select from.

The client computer 104 may also allow the check-in to be performed manually. For example, assume the user is associated with three action items, either stored locally on the client computer 104 or accessed remotely on the server computer 102; when the user arrives at a relevant location, the user can select one of the three action items to perform a manual check-in.

The user then interacts with the subject of the action item, including gathering information related to the status of the action item.

At 210, a check-out is performed. More specifically, the check-out occurs when the system 100 determines that the client computer 104 is no longer at the location. The check-out can be automatic (e.g., the GPS coordinates of the client computer 104 are determined to no longer match the location of the check-in) or manual (e.g., the client computer 104 determines that the user presses a check-out button).

If there is no location associated with the action item, the system 100 may receive (from the user) and store user-defined automatic checkout conditions. For example, consider the action item to update the general ledger by Aug. 31, 2011; whenever the system 100 detects that the general ledger has been updated, the system 100 automatically performs the check-out for that action item. Components of the system 100 that may perform the check-out include the server computer 102 (e.g., the user uses one of the applications 110 to update the general ledger), the client computer 104 (e.g., the user interfaces with the server computer 102 via the client computer 104 to use one of the applications 110 to update the general ledger), etc.

At 212, the status of the action item is updated. In general, once the user has addressed the action item resulting from the check-in, the status may be updated with new information. This new information is generally unrelated to the check-in or the check-out, since those events are separately logged. For example, if the action item relates to a meeting with Company X, the status may be updated to reflect the results of the meeting. Other users (e.g., the other members of the sales team, the sales manager, or other users associated with the action item) may then read the updated status.

For the client computer 104 (see FIG. 1), the interface component 124 controls the client computer 104 to change the status. The interface component 124 may be part of a larger user interface component that the user uses to interact with the client computer 104. The interface component 124 may provide an interface for the user to interact with the server computer 102 via the client computer 104 (e.g., in a cloud computing environment where the action item is stored on the server computer 102). As a result of changing the status, the server computer 102 may also store the updated status information; the updated status is then available to other users.

At this point, one or more action items have had their statuses updated, and the process 200 continues with the analysis phase.

At 214, a query is executed. For example, one of the applications 110 (see FIG. 1) may be a CRM application with query capability; a user composes a query (e.g., "Where did my sales team have meetings in the past seven days?"), the server computer 102 executes the query on the action items stored in the storage 112, and the server computer 102 displays the results. The user may also compose the query or view the results on the client computer 104 when the client computer 104 (e.g., the interface component 124) is configured to interoperate with the server computer 102 in this manner.

The following sections describe more details of embodiments of the system 100 and related features.

Usage Overview

The above system and method enable a full-cycled check-in mechanism in the enterprise context. An example use case is as follows. First, the entire cycle is based upon an action item, which needs to be completed as part of a business process. Each action item can be associated with a business object.

Second, the cycle starts with "booking" (see 202 in FIG. 2), which plans an activity for future execution; continues with "check-in" (see 208), which indicates the status for the task is "current". Next, the cycle goes to "check-out" (see 210), which indicates the "done" status for the task. After "check-out", the user will be given an option to create "follow up" (see 212), which again may create a new "booking" and the cycle continues.

With the above cycle-based approach, the system may achieve the following. First, at the time of "check-in", the system may bundle the following procedures all at once: to automatically identify the corresponding action item by using a mobile device's location-aware and time-aware capabilities; by logging the current checked in items, to enable the user to track what needs to be done at a regular basis; and to broadcast the starting execution status to targeted audience by sending a feed.

Second, at the time of "check-out", again the system may bundle the following procedures: to automatically use the current time as the finish time of the action item; and to send a feed to broadcast the finish of the action item.

Third, at the time of "booking", the system may guide the user through the following steps: to use keyword and place filters to search for a upcoming event already published on the web; to view the result list with time, place and event details and pick an event of interest; once the event is selected, to allow the user to specify start/end times, and in addition, to automatically provide default text for the feed, which contains general event information; and to allow the user to assign this booking to a person, for example, a colleague on the same sales team.

Fourth, for both productivity and collaboration purpose, the system may also feature an "itinerary" which allows a user to view all upcoming bookings, current "check-ins", and previous "checked-ins" in one convenient place. Furthermore, the system may also have a "stream" for a user to view other people's bookings. For example, a sales manager may use "stream" to view the upcoming bookings for sales representatives on the sales team.

An example use case is as follows. Consider CRM Sales OnDemand Mobile™ system users, who have a need to track the process of their deals. A sales deal may be broken into different stages starting from acquiring a prospect and finally having a sales contract. Each of these deal stages can be further broken down into a series of activities which can be implemented based on the full-cycled check-in process described above (see FIG. 2). In this way, the sales professionals can then follow the booking/check-in/check-out process to plan, execute, finish each action item and automatically advance to the next deal stage when all required action items for the previous stage are done.

Another use case is as follows. Joe is a sales rep at Company S, and carries his iPad™ with him wherever there is a client meeting. During a typical customer visit, Joe needs to quickly and easily perform any of the following tasks: identify the account; inform his colleagues of his customer visit; log the current visit under the account; add a contact person he just met on site; update the status of an opportunity he just won; see the plan for the rest of his day.

Still another use case is as follows. Company T is a toy company based in Europe, and wants to promote their new toys to the North American market by attending various trade shows. First, the sales manager searches for upcoming trade show events and assigns a sales rep to attend a trade show event scheduled next month (see 202 in FIG. 2). On the day of the trade show, the sales rep checks in (see 208) and notifies his colleagues. The sales rep meets a new customer contact and the sales rep instantly associates that contact with the trade show for later reference/follow up (see 212). The sales rep finishes the trade show and informs every one on the team it went successfully. The sales manager reviews the data (contacts/leads) generated in the event (see 214) and plans for follow up (e.g., create new action items, assign action items to sales reps, etc.).

According to an embodiment, the client computer 104 (e.g., via the interface component 124) implements a user interface with five general functions: check-in, booking, itinerary, stream, and analytics.

For the check-in function, the client computer 104 may display a calendar displaying relevant bookings (e.g., to be acted upon today), and may display action items having nearby locations. The user may then select one of the relevant bookings (or one of the nearby action items) for the check-in. The user interface may also have additional features related to check-in, such as displaying a map of the nearby action item locations, performing a search to show more action items, etc. For a selected action item, the user can view business objects related to the action item. For example, the company that is the sales target can be identified and the attributes of this business object can be reviewed, such as the contact persons' names, the line of business, credit worthiness, revenue, address, phone contacts, email contacts, etc. The user may also view multiple action items that may be associated with the company (sales target business object). The action item itself may also have attributes, such as the contact person, the sales cycle, the sales stage, the expected value, etc. The user may also edit these attributes or add new attributes to the various business objects (see 212 in FIG. 2).

For the booking function, the client computer 104 may display a selection of business objects for which bookings may be created. This selection of business objects may result from a search query performed on the business objects stored by the server computer 102. The user may then select one of the business objects and add a booking for it. For example, assume the user enters the query "Show trade shows in California in January". Five trade show business objects result, which may be displayed along with relevant attributes such as the name of the trade show, the date, the time, a map, etc. The user then selects one of the trade shows to add a booking.

For the itinerary function, the client computer 104 may display a list of action items arranged in a calendar. The user may then select an action item to perform check-in, check-out, view attributes, change attributes (e.g., update status), move the action item to another date, etc.

For the stream function, the client computer 104 may display a list of users for selection; when a user is selected, the itinerary for that user is displayed. Multiple users may be selected, so that a manager can get an overview of the activities of a group of users.

For the analytics function, the client computer 104 may receive queries and may display the results of the queries. The client computer may send the query to the server computer 102 to execute the query on the stored business objects. Results may be displayed as text, graphs, etc. depending upon default data views, according to query operators, or varying with user preference. As an example, a query may be to show the number of contacts, leads and opportunities for trade shows in California in January.

Time-Based Features

Although the description has focused on location-aware check-ins, time-aware checkins may also be enabled according to an embodiment; in place of or in addition to the location-aware check-ins. In fact, both time-aware and location-aware check-ins may both be applicable to the same action item.

An example of time-aware check-ins follows. Consider the CRM activity "discuss price quotes with Company X by Jul. 1, 2011". Booking this activity creates an action item that does not necessarily include a location, but does include a due date. The system 100 may display this action item as a relevant action item according to various criteria. For example, if the due date has passed, this action item may be displayed as a "past due" action item. If the due date is today, this action item may be displayed in a list of action items to be done "today", e.g., in a daily task list, calendar, appointments book, etc. If the action item includes the additional information of an early reminder (e.g., "notify 2 days in advance"), then this action item may be displayed in the daily task list for the day 2 days before July 1 (June 29). (Note that the early reminder may be customizable or may be specified in units other than days.)

An embodiment may have one or more of the following additional features. First, the client computer 104 may include an expense tracking component. The user can enter expenses, tie the expense report to an action item, etc. The user's manager can then access the expense report, run queries that include the expense report, etc.

Second, the client computer 104 may include components to integrate with other services, e.g. that provide application programming interfaces (APIs) for data exchange. For example, Google Maps™ for address information, LinkedIn™ for contact information, etc. The client computer 104 may then use the resulting data to automatically fill in details when bookings are created or edited.

Third, the client computer 104 may include a component to perform routing between action items, according to proximity, appointment time, etc. Fourth, the client computer 104 may include a component to sync between the itinerary and other calendars for the user. Fifth, the client computer 104 may include a component to reward activity such as check-ins, new sales leads acquired, deals closed, etc.

Rewards may be viewed as a specific example of gamification features (e.g., a feature that makes an activity more like a game), which are a general category of features that motivate user participation, interaction, and collaboration. When rewards are tracked the total number of rewards for each person in the group may be displayed, prompting interactive competitiveness. Another gamification feature is leveling; when all action items of level 1 difficulty have been completed, the user has access to the action items having level 2 difficulty. For example, in a CRM sales cycle, the level 1 activities may be to get one or more sales leads; the level 2 activities may be to qualify the sales leads; the level 3 activities may be to convert the sales leads to opportunities; and the level 4 activities may be to generate sales orders.

FIG. 3 is a block diagram of an example computer system and network 2400 for implementing embodiments of the present invention. Computer system 2410 includes a bus 2405 or other communication mechanism for communicating information, and a processor 2401 coupled with bus 2405 for processing information. Computer system 2410 also includes a memory 2402 coupled to bus 2405 for storing information and instructions to be executed by processor 2401, including information and instructions for performing the techniques described above. This memory may also be used for storing temporary variables or other intermediate information during execution of instructions to be executed by processor 2401. Possible implementations of this memory may be, but are not limited to, random access memory (RAM), read only memory (ROM) (when not storing temporary variables or other intermediate information), or both. A storage device 2403 is also provided for storing information and instructions. Common forms of storage devices include, for example, a hard drive, a magnetic disk, an optical disk, a CD-ROM, a DVD, a flash memory, a USB memory card, a solid state drive, or any other medium from which a computer can read. Storage device 2403 may store source code, binary code, or software files for performing the techniques or embodying the constructs above, for example.

Computer system 2410 may be coupled via bus 2405 to a display 2412, such as a cathode ray tube (CRT) or liquid crystal display (LCD), for displaying information to a computer user. An input device 2411 such as a keyboard and/or mouse is coupled to bus 2405 for communicating information and command selections from the user to processor 2401. The combination of these components allows the user to communicate with the system. In some systems, bus 2405 may be divided into multiple specialized buses.

Computer system 2410 also includes a network interface 2404 coupled with bus 2405. Network interface 2404 may provide two-way data communication between computer system 2410 and the local network 2420. The network interface 2404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 2404 sends and receives electrical, electromagnetic, or optical signals that carry digital data streams representing various types of information.

Computer system 2410 can send and receive information, including messages or other interface actions, through the network interface 2404 to an Intranet or the Internet 2430. In the Internet example, software components or services may reside on multiple different computer systems 2410 or servers 2431, 2432, 2433, 2434 and 2435 across the network. A server 2431 may transmit actions or messages from one component, through Internet 2430, local network 2420, and network interface 2404 to a component on computer system 2410.

The computer system and network 2400 may be configured in a client server manner. For example, the computer system 2410 may implement a server. The client 2415 may include components similar to those of the computer system 2410.

More specifically, the client 2415 may implement a client-side interface for displaying information generated by the server, for example via HTML or HTTP data exchanges. The computer system 2400 may implement the system 100 described above (see FIG. 1 and related text), for example by executing one or more computer programs. For example, the computer system 2410 may implement the server computer 102, and the client 2415 may implement the client computer 104.

As a specific example, the system 2400 may implement a computer-implemented method of tracking action items in an enterprise data processing environment. The method includes receiving, by the client 2415 from the server 2410, an action item that includes a location. The method further includes performing a check-in, by the client 2415, at the location related to the action item. The method further includes performing a check-out, by the client 2415, related to the action item. The method further includes changing, by the client 2415, the status of the action item.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of tracking action items in an enterprise data processing environment, comprising:

creating, by a server computer as directed by a user, an action item, wherein the action item is a data record indicating a plan to perform a certain business-related action in a future time frame, wherein the action item is a step in a larger business process, wherein once the action item has been performed, other actions in the larger business process are performed, wherein the action item includes a location, wherein the action item is one of a plurality of action items stored by the server computer, wherein the action item is associated with a business object stored by the server computer, wherein the business object is a code construct that corresponds to a thing in an actual business, wherein the business object includes data that describes the business object and a method that makes decisions based on the data, wherein the data includes instance variables, properties, and associations with other business objects, and wherein the action item is associated with the user prior to a check-in at the location;

receiving, by a client computer from the server computer, the action item;

determining, by the client computer, that the client computer is at the location related to the action item, wherein determining that the client computer is at the location corresponds to the check-in, and wherein the check-in indicates that the user is at the location;

determining, by the client computer, that the client computer is no longer at the location, wherein determining that the client computer is no longer at the check-in corresponds to a check-out;

changing, by the client computer, a status of the action item;

sending, by the server computer to the client computer, a result list that includes a plurality of follow-up action items that follow the action item in the larger business process;

receiving, by the server computer, a selection of a selected follow-up action item from the plurality of follow-up action items in the result list; and receiving, by the server computer, an assignment that assigns the selected follow-up action item to one of a plurality of users, wherein the client computer includes a wireless local area network card that connects to a wireless hotspot, wherein the server computer determines the location of the client computer according to a hotspot location of the wireless hotspot.

2. The computer-implemented method of claim 1, further comprising:

creating, by the server computer as directed by at least one of a group of users, the action item, wherein the check-in is associated with one of the group of users.

3. The computer-implemented method of claim 1, further comprising:

associating the action item with a plurality of users, at least some of whom perform the check-in, perform the check-out, and change the status of the action item.

4. The computer-implemented method of claim 1, wherein the status is other than performing the check-in and is other than performing the check-out.

5. The computer-implemented method of claim 1, further comprising:

storing, by the server computer, a plurality of statuses related to the action item, wherein changing the status comprises changing the status from one of the plurality of statuses to another of the plurality of statuses.

6. The computer-implemented method of claim 1, further comprising:

storing, by the server computer, the plurality of action items that includes the action item; and executing, by the server computer, a query that generates a result based on the plurality of action items.

7. The computer-implemented method of claim 1, further comprising:

storing, by the server computer, the plurality of action items that includes the action item, wherein the plurality of action items are related to a plurality of users; and executing, by the server computer, a query that generates a result based on the plurality of action items.

8. The computer-implemented method of claim 1, further comprising:

storing, by the server computer, the status related to the action item.

9. The computer-implemented method of claim 1, further comprising:

communicating, from the client computer to the server computer, the status of the action item having been changed.

10. The computer-implemented method of claim 1, further comprising:

displaying, by the client computer, the action item as one of the plurality of action items arranged in a calendar.

11. The computer-implemented method of claim 1, further comprising:

displaying, by the client computer, a list of users;

receiving, by the client computer, a selection of one of the list of users; and displaying, by the client computer, the plurality of action items arranged in a calendar that are associated with the one of the list of users.

12. The computer-implemented method of claim 1, wherein the action item includes a due date.

13. The computer-implemented method of claim 1, wherein the action item is associated with a plurality of business objects that includes the business object.

14. The computer-implemented method of claim 1, wherein the action item is non-recurring.

15. The computer-implemented method of claim 1, further comprising:
sending, by the server computer in a feed to the plurality of users, a start broadcast in response to the check-in by the user; and
sending, by the server computer in the feed to the plurality of users, a finish broadcast in response to the check-out by the user.

16. A system for tracking action items in an enterprise data processing environment, comprising:
a server computer; and
a client computer,
wherein the server computer is configured to create, as directed by a user, an action item, wherein the server computer is configured to store the action item, wherein the action item is a data record indicating a plan to perform a certain business-related action in a future time frame, wherein the action item is a step in a larger business process, wherein once the action item has been performed, other actions in the larger business process are performed, wherein the action item includes a location, wherein the action item is one of a plurality of action items stored by the server computer, wherein the action item is associated with a business object stored by the server computer, wherein the business object is a code construct that corresponds to a thing in an actual business, wherein the business object includes data that describes the business object and a method that makes decisions based on the data, wherein the data includes instance variables, properties, and associations with other business objects, and wherein the action item is associated with the user prior to a check-in at the location,
wherein the client computer is configured to perform the check-in at the location related to the action item, to perform a check-out related to the action item, and to change a status of the action item, wherein the check-in indicates that the user is at the location,
wherein the server computer is configured to send, to the client computer, a result list that includes a plurality of follow-up action items that follow the action item in the larger business process, to receive a selection of a selected follow-up action item from the plurality of follow-up action items in the result list, and to receive an assignment that assigns the selected follow-up action item to one of a plurality of users,
wherein the client computer includes a wireless local area network card that connects to a wireless hotspot, wherein the server computer determines the location of the client computer according to a hotspot location of the wireless hotspot.

17. The system of claim 16, wherein the server computer is configured to store the plurality of action items that includes the action item, and to execute a query that generates a result based on the plurality of action items.

18. A non-transitory computer readable medium storing instructions to control a computer system for tracking action items in an enterprise data processing environment, comprising:

a creation component, executed by a server computer, that controls the server computer to create an action item as directed by a user, wherein the action item is a data record indicating a plan to perform a certain business-related action in a future time frame, wherein the action item is a step in a larger business process, wherein once the action item has been performed, other actions in the larger business process are performed, wherein the action item includes a location, wherein the action item is one of a plurality of action items stored by the server computer, wherein the action item is associated with a business object stored by the server computer, wherein the business object is a code construct that corresponds to a thing in an actual business, wherein the business object includes data that describes the business object and a method that makes decisions based on the data, wherein the data includes instance variables, properties, and associations with other business objects, and wherein the action item is associated with the user prior to a check-in at the location;
a reception component, executed by a client computer, that controls the client computer to receive, from the server computer, the action item;
a check-in component, executed by the client computer, that controls the client computer to determine that the client computer is at the location related to the action item, wherein determining that the client computer is at the location corresponds to the check-in, and wherein the check-in indicates that the user is at the location;
a check-out component, executed by the client computer, that controls the client computer to determine that the client computer is no longer at the location, wherein determining that the client computer is no longer at the check-in corresponds to a check-out;
a data interface component, executed by the client computer, that controls the client computer to change a status of the action item;
a sending component, executed by the server computer, that controls the server computer to send, to the client computer, a result list that includes a plurality of follow-up action items that follow the action item in the larger business process;
a first receiving component, executed by the server computer, that controls the server computer to receive a selection of a selected follow-up action item from the plurality of follow-up action items in the result list; and
a second receiving component, executed by the server computer, that controls the server computer to receive an assignment that assigns the selected follow-up action item to one of a plurality of users,
wherein the client computer includes a wireless local area network card that connects to a wireless hotspot, wherein the server computer determines the location of the client computer according to a hotspot location of the wireless hotspot.

19. The non-transitory computer readable medium of claim 18, further comprising:
a storing component, executed by the server computer, that stores the plurality of action items that includes the action item; and
an executing component, executed by the server computer, that executes a query that generates a result based on the plurality of action items.

* * * * *